(12) United States Patent
Bailey (10) Patent No.: US 11,272,601 B2
(45) Date of Patent: Mar. 8, 2022

(54) LIGHT FIXTURE WITH INTEGRATED INPUT/OUTPUT MODULE (71) Applicant: Hubbell Incorporated, Shelton, CT (US)

(72) Inventor: Christopher Lane Bailey, Greenville, SC (US)

(73) Assignee: Hubbell Incorporated, Shelton, CT (US)

( * ) Notice: Subject to any disclaimer, the term of this patent is extended or adjusted under 35 U.S.C. 154(b) by 0 days.

(21) Appl. No.: 16/883,593

(22) Filed: May 26, 2020

(65) Prior Publication Data

US 2020/0375007 A1 Nov. 26, 2020

Related U.S. Application Data (60) Provisional application No. 62/852,864, filed on May 24, 2019.

(51) Int. Cl.
| | |
|---|---|
| *F21V 23/00* | (2015.01) |
| *H05B 47/125* | (2020.01) |
| *H05B 47/12* | (2020.01) |
| *H05B 47/13* | (2020.01) |
| *F21S 8/02* | (2006.01) |
| *H05B 45/22* | (2020.01) |
| *F21Y 103/10* | (2016.01) |

(52) U.S. Cl.
CPC ............ *H05B 47/125* (2020.01); *F21S 8/026* (2013.01); *F21V 23/003* (2013.01); *H05B 45/22* (2020.01); *H05B 47/12* (2020.01); *H05B 47/13* (2020.01); *F21Y 2103/10* (2016.08)

(58) Field of Classification Search
None
See application file for complete search history.

(56) References Cited

U.S. PATENT DOCUMENTS

| | | |
|---|---|---|
| 9,172,917 B1 | 10/2015 | Fu et al. |
| 2011/0188240 A1 | 8/2011 | Simon |
| 2015/0130359 A1 | 5/2015 | Bosua et al. |
| 2015/0163881 A1 | 6/2015 | Pederson |
| 2015/0195883 A1* | 7/2015 | Harris ................ H05B 45/12 315/155 |
| 2017/0027045 A1 | 1/2017 | Chemel |
| 2017/0083748 A1 | 3/2017 | Zhou et al. |
| 2018/0193501 A1* | 7/2018 | Ufkes .................. A61L 2/10 |
| 2019/0060492 A1 | 2/2019 | Dabney |
| 2020/0147249 A1* | 5/2020 | Hussein ............... A61L 2/24 |
| 2020/0179544 A1* | 6/2020 | Ufkes .................. H05B 45/20 |

OTHER PUBLICATIONS

PCT/US2020/034556 International Search Report and Written Opinion dated Aug. 12, 2020 (16 pages).

* cited by examiner

*Primary Examiner* — Dedei K Hammond
(74) *Attorney, Agent, or Firm* — Michael Best & Friedrich LLP (57) ABSTRACT

A system includes a luminaire and an input/output device. The luminaire includes a housing and a light emitting element supported on the housing, and the light emitting element is in electrical communication with a power source. The input/output device is supported on the housing and is configured to detect activity in an area proximate the luminaire. The input/output device includes a camera having a lens.

20 Claims, 7 Drawing Sheets

LIGHT FIXTURE WITH INTEGRATED INPUT/OUTPUT MODULE

REFERENCE TO RELATED APPLICATION

This application claims the benefit of U.S. Provisional Patent Application No. 62/852,864, filed May 24, 2019, the entire contents of which are incorporated by reference.

FIELD

The present disclosure relates to light fixtures, and particularly to a light fixture including a camera.

SUMMARY

In one independent aspect, a system includes a luminaire and an input/output device. The luminaire includes a housing and a light emitting element supported on the housing, and the light emitting element is in electrical communication with a power source. The input/output device is supported on the housing and is configured to detect activity in an area proximate the luminaire. The input/output device includes a camera having a lens.

In some aspects, the luminaire includes a plurality of light emitting elements, wherein the input/output device is supported on the housing in a location between at least two light emitting elements.

In some aspects, the system further includes a controller in communication with the input/output device, the controller including an electronic processor and memory, the controller configured to initiate a control operation based on information provided by the input/output device.

In some aspects, the input/output device detects an amount of interaction in the area proximate the luminaire, wherein the control operation includes initiating an antimicrobial action based on the detected interaction in the area proximate the luminaire.

In some aspects, the input/output device detects an amount of interaction in the area proximate the luminaire, wherein a processor receives the information and generates a map of the area proximate the luminaire with variations in the amount of interaction represented by different colors.

In some aspects, the input/output device includes a light sensor.

In some aspects, the input/output device includes an infrared light emitter.

In some aspects, the input/output device includes a microphone.

In some aspects, the input/output device includes a speaker.

In some aspects, the luminaire is a recessed light fixture supported in a ceiling surface.

In some aspects, the luminaire is a linear light fixture.

In another independent aspect, a light fixture assembly includes a housing, a light emitting element supported on the housing, and an input/output device supported on the housing. The light emitting element is in electrical communication with a power source. The input/output device is configured to detect activity in an area proximate the luminaire, and the input/output device includes a microphone and a camera having a lens.

In some aspects, the luminaire includes a plurality of light emitting elements, wherein the input/output device is supported on the housing in a location between at least two light emitting elements.

In some aspects, the input/output device is configured to transmit a signal regarding detected activity in the area proximate the luminaire to a computer including a processor.

In some aspects, the input/output device includes a light sensor.

In some aspects, the input/output device includes an infrared light emitter.

In some aspects, the input/output device includes a speaker.

In some aspects, the luminaire is a recessed light fixture supported in a ceiling surface.

In some aspects, the luminaire is a linear light fixture.

Other aspects of the disclosure will become apparent by consideration of the detailed description and accompanying drawings.

DETAILED DESCRIPTION

Before any embodiments are explained in detail, it is to be understood that the disclosure is not limited in its application to the details of construction and the arrangement of components set forth in the following description or illustrated in the following drawings. The disclosure is capable of other embodiments and of being practiced or of being carried out in various ways. Also, it is to be understood that the phraseology and terminology used herein is for the purpose of description and should not be regarded as limiting. Use of "including" and "comprising" and variations thereof as used herein is meant to encompass the items listed thereafter and equivalents thereof as well as additional items. Use of "consisting of" and variations thereof as used herein is meant to encompass only the items listed thereafter and equivalents thereof. Unless specified or limited otherwise, the terms "mounted," "connected," "supported," and "coupled" and variations thereof are used broadly and encompass both direct and indirect mountings, connections, supports, and couplings.

Figure 1:
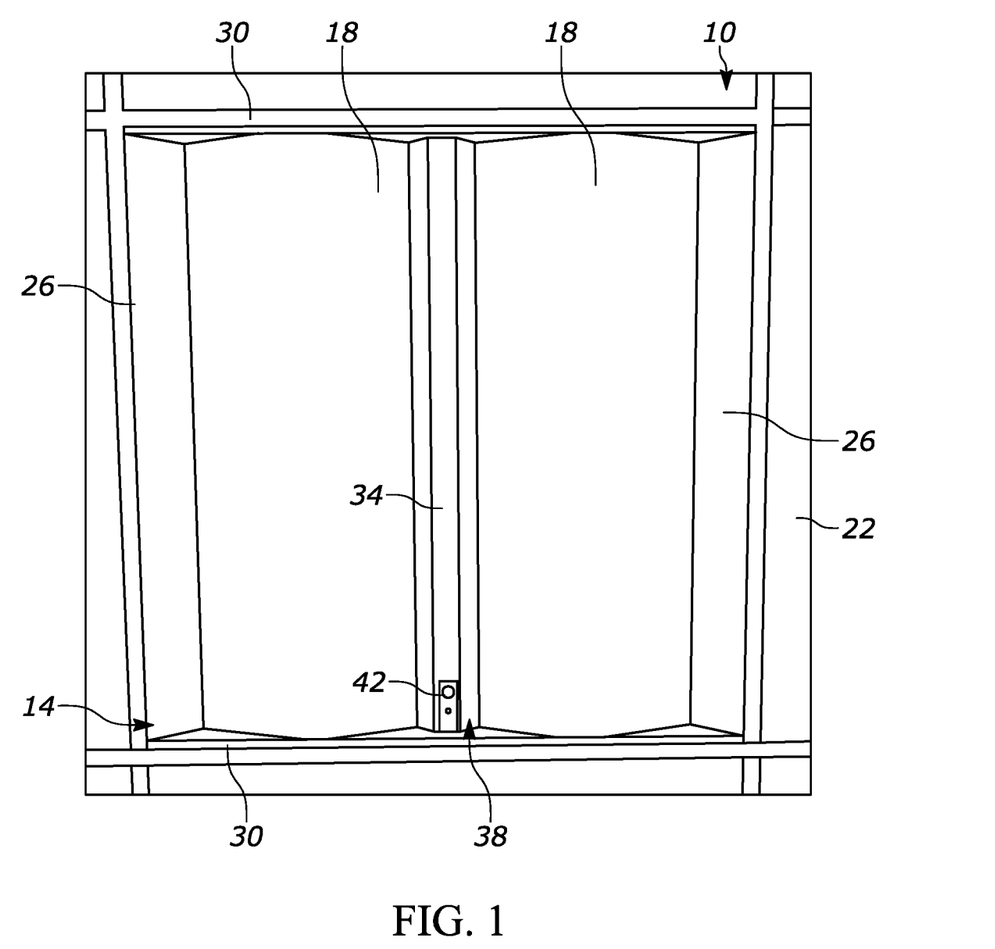
FIG. 1 is a plan view of a light fixture.
Figure 2:
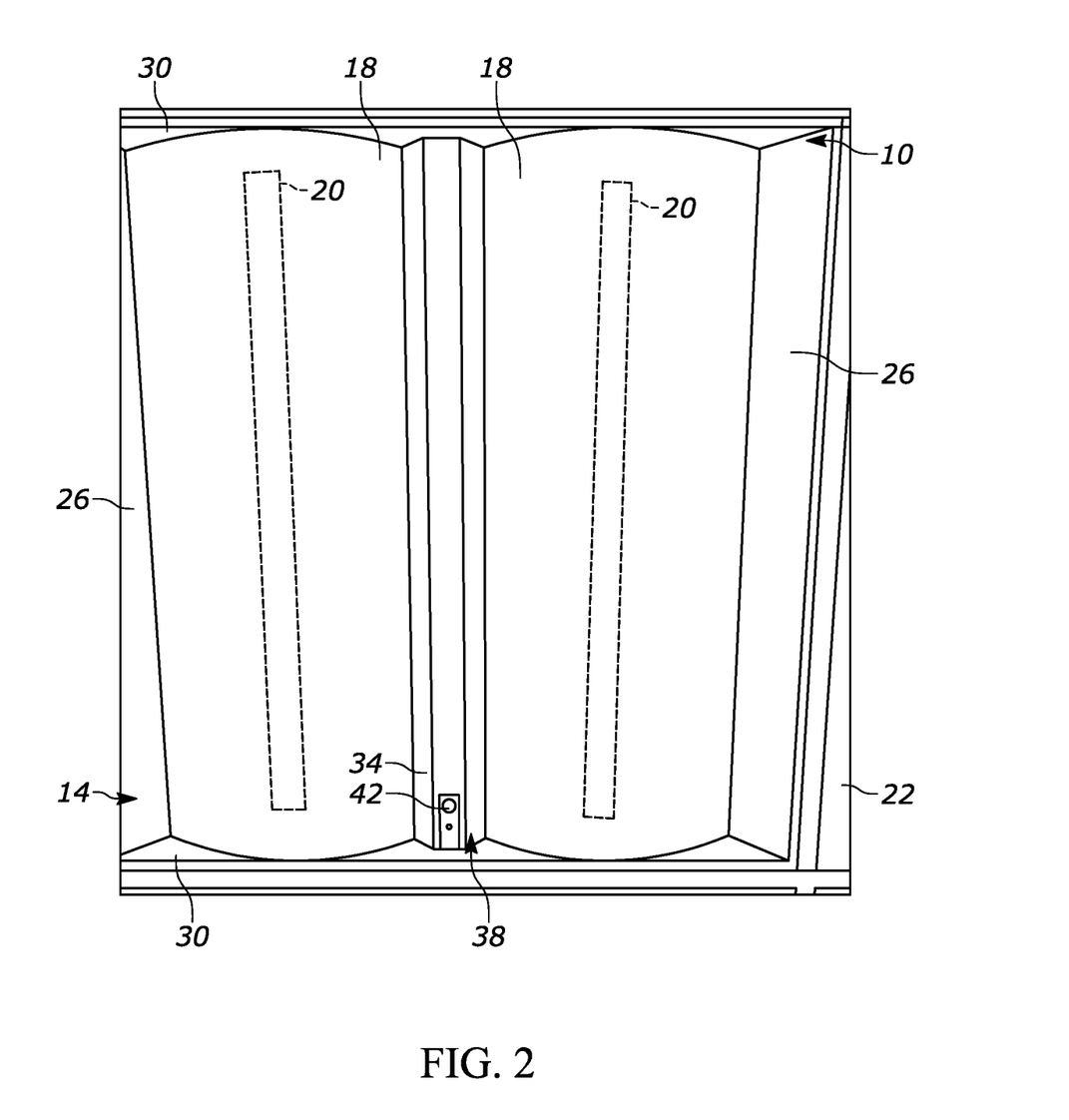
FIG. 2 is another plan view of a light fixture.

As shown in FIGS. 1 and 2, a light fixture 10 includes a frame or housing 14 and an optic or lens portion 18. In the illustrated embodiment, the housing 14 has a rectangular or square shape and is configured to be supported in a ceiling 22 in a recessed position, and a lower surface of the housing 14 is flush with the ceiling 22. The housing 14 includes light emitting elements 20, and the light emitting elements 20 are in communication with a power source (e.g., an LED driver—not shown). The light emitting elements 20 may include, but are not limited to, incandescent lights, fluorescent lights, halogen lights, metal halide lights, organic light-emitting diodes (OLEDs), and light-emitting diodes (LEDs). In the illustrated embodiment, the frame 14 further includes a pair of sides 26, a pair of ends 30, and an intermediate portion 34 positioned between and parallel to the sides 26. In the illustrated embodiment, the intermediate portion 34 is aligned with a center longitudinal axis of the fixture 10. The intermediate portion 34 is positioned between a pair of light emitting elements 20, each of which are covered by an optic 18.

Figure 3:
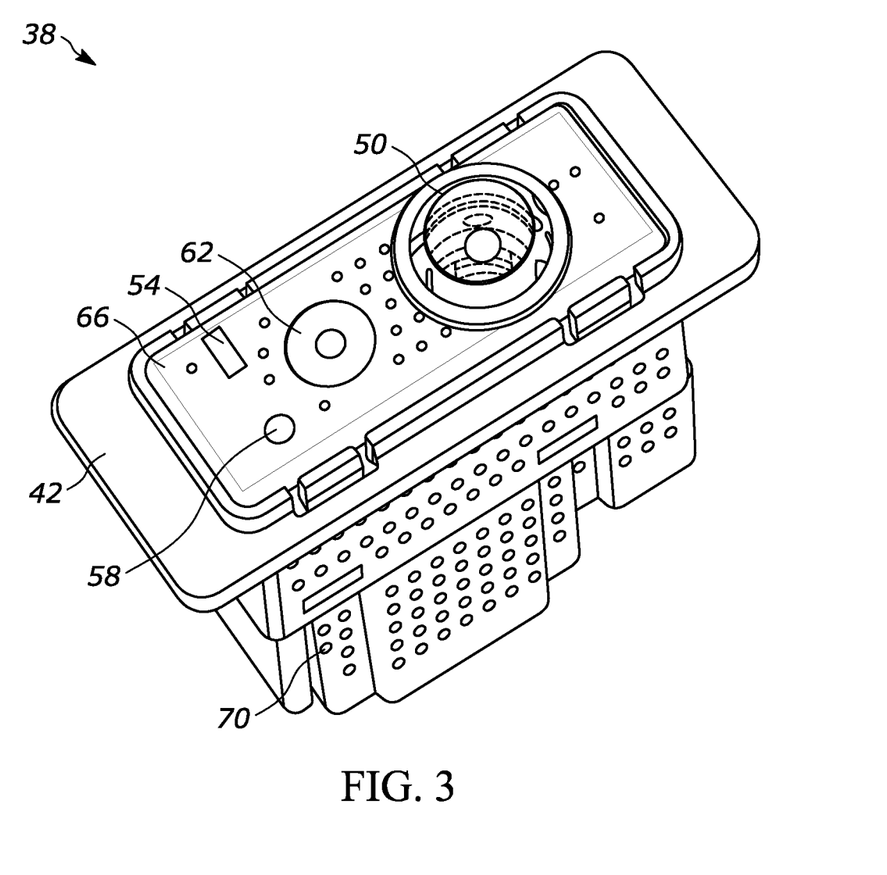
FIG. 3 is a perspective view of an input/output module.

An input/output (I/O) module 38 is supported on the housing 14. In the illustrated embodiment, the I/O module 38 is positioned on the intermediate portion 34 of the fixture 10 and has a rectangular shaped housing or adapter 42 configured to fit within the housing 14 of the fixture 10. As shown in FIG. 3, the I/O module 38 includes a camera 50 having a lens. In some embodiments, the camera 50 is oriented in a direction that is oblique or perpendicular with respect to the plane of the light fixture 10. In some embodiments, the camera 50 is oriented on an inclined angle relative to a surface of the light fixture 10 and/or relative to the ceiling. In other embodiments, the lens 50 may be oriented in a different manner on the fixture 10 (e.g., on a periphery and/or a trim of the fixture 10). The I/O module 38 also includes an indicator light 54 to indicate a status of the camera (e.g., on, off, ready to connect, connected, etc.).

Figure 4:
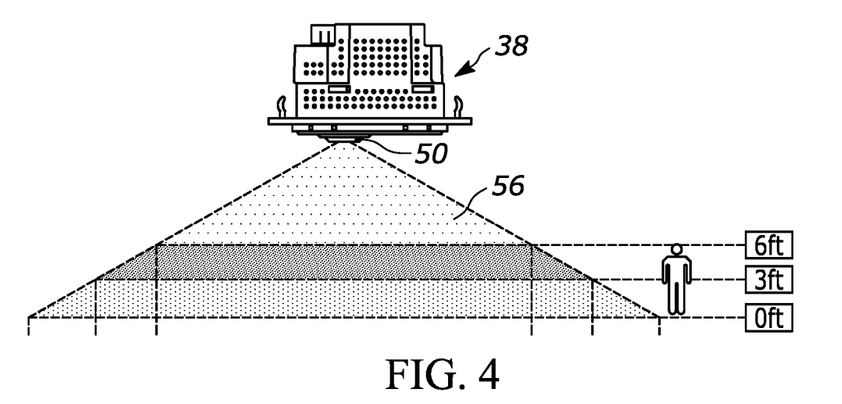
FIG. 4 is a side view of a diagram of a field of view of a camera of the input/output module of FIG. 3.
Figure 5:
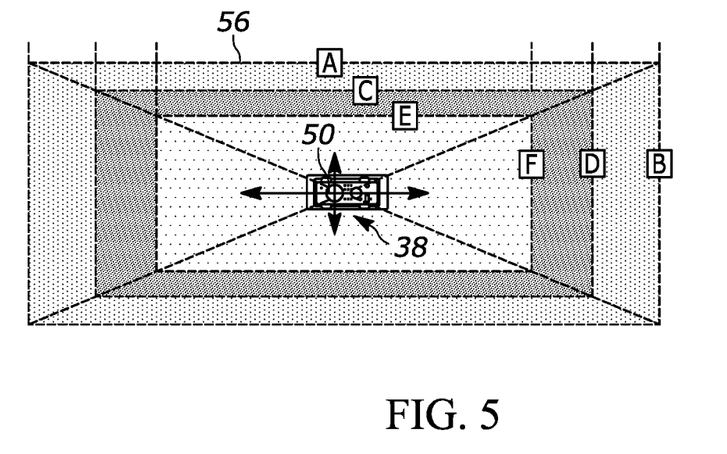
FIG. 5 is a bottom view of a diagram of a field of view of a camera of the input/output module of FIG. 3.

In some embodiments, the camera 50 may be a high-resolution, high-definition camera including a 2.8 mm lens with a 140 degree field of view. As shown in FIGS. 4 and 5, the camera 50 may cover an area 56 having a rectangular shape (dimensions A and B) In some embodiments, the area 56 has dimensions 27.5 feet×10.8 feet when the module 38 is supported at a height of 10 feet. In some embodiments, the area 56 has dimensions 33 feet×13 feet when the module 38 is supported at a height of 12 feet. In some embodiments, the area 56 has dimensions 38.5 feet×15.2 feet when the I/O module 38 is supported at a height of 14 feet. In other embodiments, the coverage area may have a different shape and/or size.

Referring again to FIG. 3, the I/O module 38 further includes a light sensor 58 as well as an infrared (IR) emitter 62 for low-light and no-light conditions. In the illustrated embodiment, the module 38 also includes a microphone 66 and a speaker 70 supporting two-way audio communication. The module 38 supports wireless connection (e.g., Wi-Fi) and supports data encryption (e.g., conforming with AES-256 standard) and secure data transmission (e.g., using Open TLS/SSL). In some embodiments, the module 38 is in communication with other cameras and/or other control systems. The module 38 is also compatible with mobile and web-based applications as well as tiered cloud services.

Figure 6:
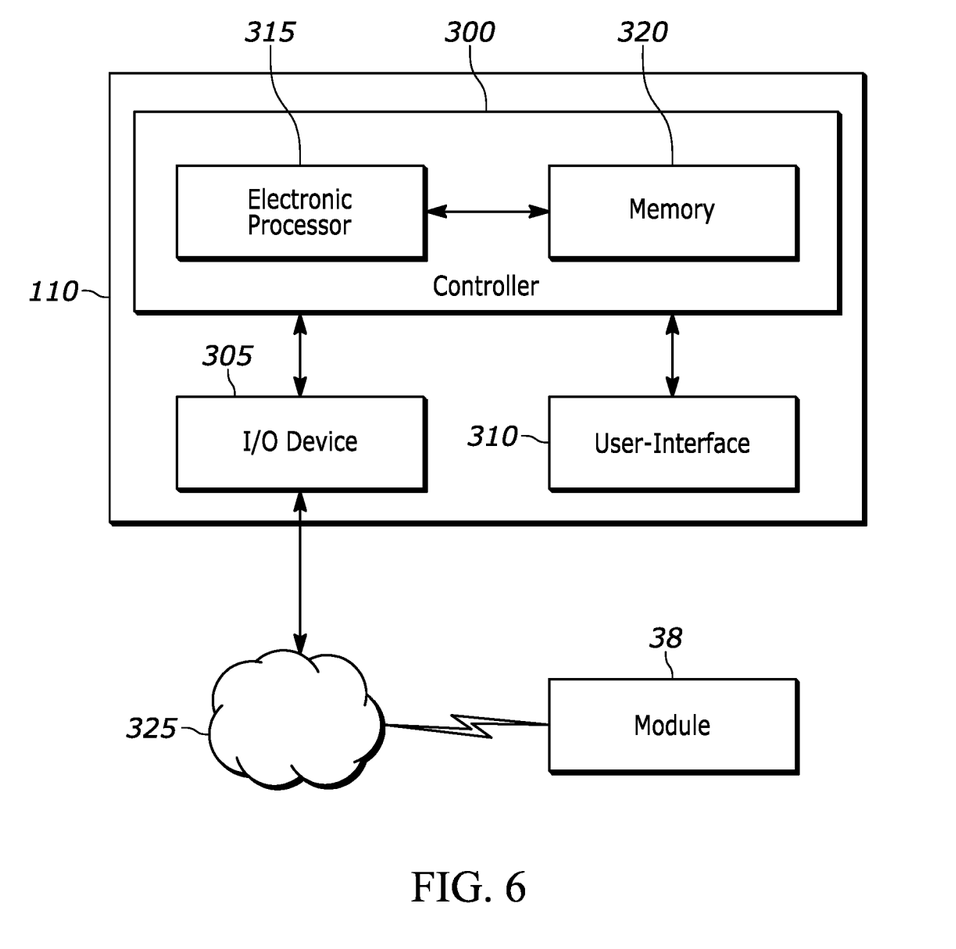
FIG. 6 is a schematic diagram of a system including a controller and the input/output module of FIG. 3.

In some embodiments, the I/O module 38 is in communication (e.g., wireless communication) with a computer 110. Referring to FIG. 6, in some embodiments the computer 110 includes a controller 300 electrically and/or communicatively coupled to an input/output (I/O) interface 305 and a user-interface 310. In some embodiments, the controller 300 includes a plurality of electrical and electronic components that provide power, operational control, and protection to the components and modules within the controller 300 and/or other components of the system. For example, the controller 300 includes an electronic processor 315 (for example, a microprocessor or another suitable programmable device) and memory 320. The memory 320 includes, for example, a program storage area and a data storage area. The program storage area and the data storage area can include combinations of different types of memory, such as read-only memory (ROM), random access memory (RAM). Various non-transitory computer readable media, for example, magnetic, optical, physical, or electronic memory may be used. The electronic processor 315 is communicatively coupled to the memory 320 and executes software instructions that are stored in the memory 320, or stored on another non-transitory computer readable medium such as another memory or a disc. The software may include one or more applications, program data, filters, rules, one or more program modules, and other executable instructions.

The I/O interface 305 may be configured to input and output data from the computer 110 to outside device(s), for example, through a network 325. The network 325 may be, for example, a wide area network (WAN) (e.g., a TCP/IP based network, a cellular network, such as, for example, a Global System for Mobile Communications [GSM] network, a General Packet Radio Service [GPRS] network, a Code Division Multiple Access [CDMA] network, an Evolution-Data Optimized [EV-DO] network, an Enhanced Data Rates for GSM Evolution [EDGE] network, a 3GSM network, a 4GSM network, a 5G network, a Digital Enhanced Cordless Telecommunications [DECT] network, a Digital AMPS [IS-136/TDMA] network, or an Integrated Digital Enhanced Network [iDEN] network, etc.). In other embodiments, the network is, for example, a local area network (LAN), a neighborhood area network (NAN), a home area network (HAN), or personal area network (PAN) employing any of a variety of communications protocols, such as Wi-Fi, Bluetooth, ZigBee, etc.

The user-interface 310 may be configured to output and/or receive information to/from a user. In some embodiments, the user-interface 310 includes a display (for example, a primary display, a secondary display, etc.), an indicator (for example, a light-emitting diode (LED)), and/or input devices (for example, touch-screen displays, a plurality of knobs, dials, switches, buttons, etc.). The display may be, for example, a liquid crystal display ("LCD"), a light-emitting diode ("LED") display, an organic LED ("OLED") display, an electroluminescent display ("ELD"), a surface-conduction electron-emitter display ("SED"), a field emission display ("FED"), a thin-film transistor ("TFT") LCD, etc. Although illustrated as being included in, or along with, the main computer 105, in other embodiments, the user-interface 310 may be included in, or part of, the one or more apparatuses 110.

In general operation, the computer 110 receives information (for example, through the I/O interface 305 and the network 325) from one or more modules 38. In some embodiments, the computer 110 receives image/video data via the camera 50 and/or sound data via the microphone 66. The computer 110 processes the information and outputs the information to a user via the user-interface 310. In some embodiments, the computer 110 outputs the information to other systems (for example, other main computers, a main server, external computers, tablets, smartphones, etc.). In some embodiments, the computer 110 outputs information via a short message service (SMS) and/or push notifications.

The integration of the I/O module 38 with a light fixture provides a lighting-based wireless video security solution and may be implemented in a variety of locations, including but not limited to offices, corridors, stairwells, escalators, cafeterias, common areas, mechanical/electrical rooms, entrances/exits, loading/receiving docks, datacenters, IT closets, bank counters, drive-throughs, classrooms, laboratories, parking garages, factory floors, warehouses, secure storage areas, and points of sale.

In addition, the I/O module 38 (or a network of I/O modules 38) also provides lighting-based imaging to monitor the occurrence, frequency, and degree of human interaction/contact with various surfaces (e.g., desks, countertops, floor areas, doors/door handles, other equipment, etc.).

The information may be used to determine which locations within a facility need to be sanitized and how frequently it needs to be sanitized. In addition, the I/O module 38 (or a network of I/O modules 38) may be used to monitor utilization (e.g., pedestrian traffic within a space). Incorporation of the I/O module 38 within a light fixture (typically in an overhead location) permits the module to cover large areas.

Furthermore, when implemented within a network, one or more I/O modules 38 can be used to develop a combined overhead view of a space. An example of such a system is described in U.S. application Ser. No. 16/857,861, filed Apr. 24, 2020, the entire contents of which are incorporated by reference herein. The information provided by the system of modules 38 can be used to generate a representation of the utilization/interaction of personnel in the covered area 56 by rendering an overlay of the area 58 with an array of colored regions that correspond to the degree of activity over a predetermined time interval (similar to a heat map). Furthermore, the controller 300 may, based on the information provided by the module(s) 38 regarding an amount of human interaction over a predetermined time interval, execute a control operation having an antimicrobial component. For example, the controller 300 can transmit a report to a system manager to apply a disinfectant agent to a particular region of the covered area 56. In another example, the controller 300 can transmit a signal to operate a dispenser or cleaning device to apply a disinfectant agent in a particular region of the covered area.

Figure 7:
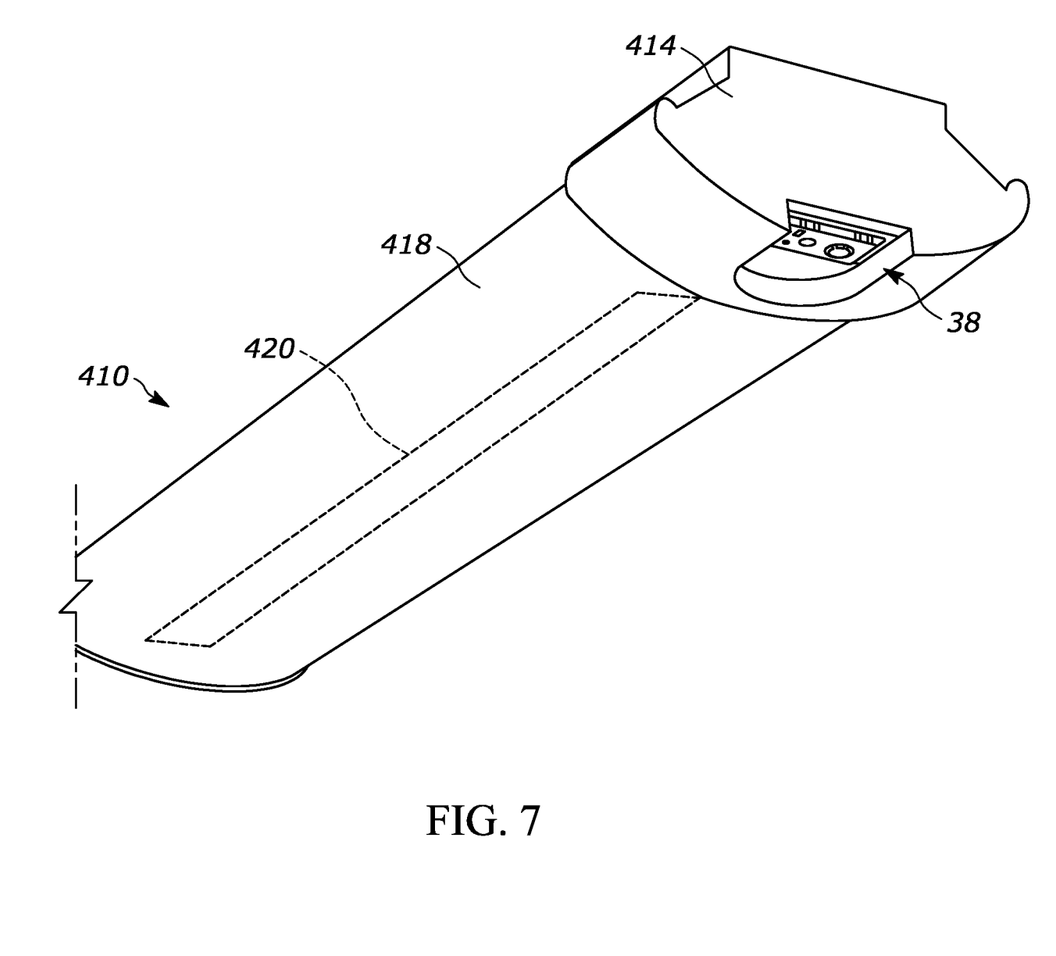
FIG. 7 is a perspective view of a light fixture according to another embodiment.
Figure 8:
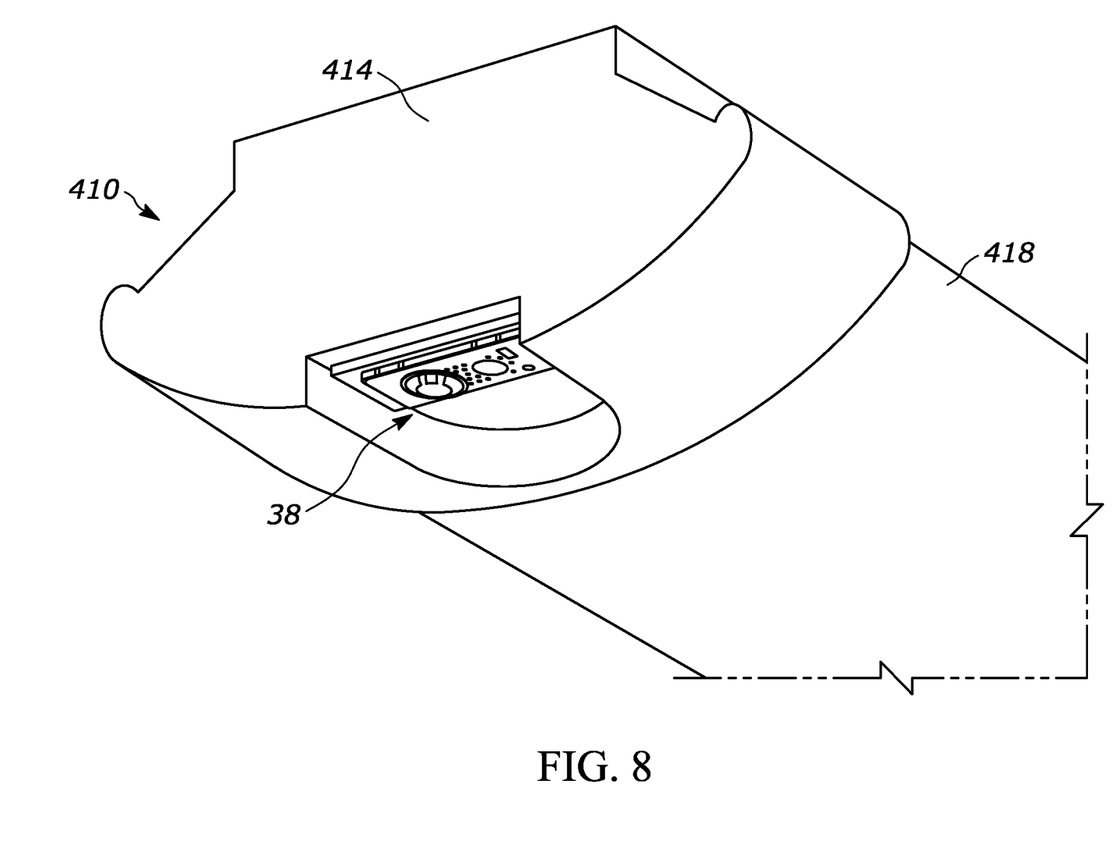
FIG. 8 is an enlarged perspective view of a portion of the light fixture of FIG. 7.

In other embodiments, the I/O module 38 may be incorporated into a different type of light fixture. For example, as shown in FIGS. 7 and 8, the light fixture may be a linear luminaire 410 including a light emitting element 420, and optic 418, and an end cap 414 on each end of the luminaire 410. The I/O module 38 may be positioned on one of the end caps 414.

Although various aspects have been described in detail with reference to certain embodiments, variations and modifications exist within the scope and spirit of one or more independent aspects as described. Various features and advantages are set forth in the following claims.

What is claimed is:

1. A system comprising:
   a luminaire including,
      a housing, and
      a light emitting element supported on the housing, the light emitting element in electrical communication with a power source;
   an input/output device supported on the housing and configured to detect activity in an area proximate the luminaire, the input/output device including a camera having a lens, and
   a controller in communication with the input/output device, the controller having a processor and memory,
   wherein the input/output device detects an amount of interaction in the area proximate the luminaire and the processor receives the information and generates a map of the area proximate the luminaire with variations in the amount of interaction represented in different regions.

2. The system of claim 1, wherein the luminaire includes a plurality of light emitting elements, wherein the input/output device is supported on the housing in a location between at least two light emitting elements.

3. The system of claim 1, wherein the controller is configured to initiate a control operation based on information provided by the input/output device.

4. The system of claim 3, wherein the input/output device detects an amount of interaction in the area proximate the luminaire, wherein the control operation includes initiating an antimicrobial action based on the detected interaction in the area proximate the luminaire.

5. The system of claim 1, wherein the variations in the amount of interaction are represented by different colors in the different regions.

6. The system of claim 1, wherein the input/output device includes a light sensor.

7. The system of claim 1, wherein the input/output device includes an infrared light emitter.

8. The system of claim 1, wherein the input/output device includes a microphone.

9. The system of claim 1, wherein the input/output device includes a speaker.

10. The system of claim 1, wherein the luminaire is a recessed light fixture supported in a ceiling surface.

11. The system of claim 1, wherein the luminaire is a linear light fixture.

12. A light fixture assembly comprising:
    a luminaire having a housing; and
    a light emitting element supported on the housing, the light emitting element in electrical communication with a power source; and
    an input/output device supported on the housing and configured to detect activity in an area proximate the luminaire, the input/output device including a microphone and a camera having a lens; and
    a controller in communication with the input/output device, the controller having a processor and memory,
    wherein the input/output device detects an amount of interaction in the area proximate the luminaire and the processor receives the information and generates a map of the area proximate the luminaire with variations in the amount of interaction represented in different regions.

13. The light fixture assembly of claim 12, wherein the luminaire includes a plurality of light emitting elements, wherein the input/output device is supported on the housing in a location between at least two light emitting elements.

14. The light fixture assembly of claim 12, wherein the input/output device is configured to transmit a signal regarding detected activity in the area proximate the luminaire over a wireless network.

15. The light fixture assembly of claim 12, wherein the input/output device includes a light sensor.

16. The light fixture assembly of claim 12, wherein the input/output device includes an infrared light emitter.

17. The light fixture assembly of claim 12, wherein the input/output device includes a speaker.

18. The light fixture assembly of claim 12, wherein the luminaire is a recessed light fixture supported in a ceiling surface.

19. The light fixture assembly of claim 12, wherein the luminaire is a linear light fixture.

20. The light fixture assembly of claim 12, wherein the variations in the amount of interaction are represented by different colors in the different regions.

* * * * *